United States Patent [19]

Akkapeddi et al.

[11] Patent Number: 5,504,158

[45] Date of Patent: Apr. 2, 1996

[54] POLYPHENYLENE ETHER/POLYTEREPHTHALAMIDE BLEND

[75] Inventors: Murali K. Akkapeddi; Jeffrey H. Glans, both of Morristown, N.J.

[73] Assignee: AlliedSignal Inc., Morris Township, N.J.

[21] Appl. No.: 370,745

[22] Filed: Jan. 10, 1995

Related U.S. Application Data

[63] Continuation of Ser. No. 965,655, Oct. 23, 1992, abandoned.

[51] Int. Cl.$^6$ ........................................................ C08F 8/00
[52] U.S. Cl. ........................ 525/133; 528/86; 528/272; 528/296; 528/302; 528/303; 528/306; 528/308; 528/308.6; 528/332; 528/335; 528/392; 525/66; 525/68; 525/132; 525/240; 525/391; 525/397; 525/420; 525/421; 525/426
[58] Field of Search ............................ 528/86, 272, 296, 528/302, 303, 306, 308, 308.6, 332, 335, 392; 525/66, 68, 132, 133, 240, 391, 397, 420, 421, 426

[56] References Cited

U.S. PATENT DOCUMENTS 3,850,862  11/1974  Clendinning .
3,932,319  1/1976   Clendinning .
4,863,996  9/1989   Nakazima et al. ................. 525/92

FOREIGN PATENT DOCUMENTS 0400418  12/1990  European Pat. Off. .

*Primary Examiner*—Samuel A. Acquah
*Attorney, Agent, or Firm*—Michele G. Mangini

[57] ABSTRACT

There is provided in accordance with the present invention polyphenylene ether/polyalkyleneterephthalamide compositions of high dimensional stabilities that are suitable for high temeprature applications comprising from about 20 to about 70 weight % of a functionalized polyphenylene ether; from about 20 to about 70 weight % of a polyalkyleneterephthalamide, wherein the polyalkyleneterephthalamide is derived from terephthalic acid and an $\alpha,\omega$-alkanediamine having 10 to 14 methylene groups; and from about 0 to about 20 weight % of a functionalized elastomeric polymer, wherein the blend absorbs less than 2 wt % of moisture and has a dimensional growth in water of less than 0.5%.

20 Claims, No Drawings

POLYPHENYLENE ETHER/POLYTEREPHTHALAMIDE BLEND

CROSS-REFERENCE TO RELATED APPLICATION

This application in a continuation of United States application Ser. No. 07/965,655, filed Oct. 23, 1992, which now abandoned.

BACKGROUND OF THE INVENTION

1. Field of the Invention

This invention relates to polyphenylene ether/polyamide blend compositions which exhibit improved dimensional stability and high-temperature capability.

2. Description of the Prior Art

Polyphenylene ether (PPE) polymers are thermoplastic polymers exhibiting various superior properties, including mechanical properties, heat resistance, electrical properties, chemical resistance and flame resistance. However, PPE polymers suffer from inferior processability due to their high melt viscosity and have a tendency to crosslink at the high processing temperature needed for melt flow. Polyamides, commonly known as nylon resins, are well known for possessing an outstanding combination of strength, toughness and chemical resistance as well as for their processability, but conventional polyamides are hygroscopic and, thus, are not dimensionally stable. Consequently, it is desirable to produce PPE/polyamide blend compositions in which useful properties of the two polymers are maintained. However, as is known in the art, PPE and polyamides are not compatible and when blended together, they do not form a composition of practical use since the polymers have significantly different melt viscosities and polarities.

Various methods of improving compatibility of PPE polymers and polyamides are disclosed in the prior art, which include U.S. Pat. No. 4,315,086 to Ueno et al., U.S. Pat. No. 4,600,741 to Aycock et al., U.S. Pat. No. 4,732,938 to Grant et al., and U.S. Pat. No. 4,863,996 to Nakazima et al. Although these prior art disclosures provide compatibilized PPE/polyamide blends having improved impact properties and processability, these compositions still do not provide dimensional stability and high-temperature capability.

U.S. Pat. No. 4,990,564 to Taubitz et al. discloses a PPE/polyamide blend that is heat distortion resistant and mold-shrink resistant. The blend contains a copolyamide that is composed of 20–90% by weight of units derived from terephthalic acid and hexamethylenediamine, and at least 10% of aliphatic polyamide units, either of nylon 6 or nylon 6,6 units. Although the blend disclosed therein exhibits improved properties including heat distortion resistance, the blend retains the moisture sensitivity and dimensional instability against heat and moisture of conventional polyamides.

It therefore would be desirable to provide PPE/polyamide compositions that exhibit high dimensional stability and high-temperature capability as well as improved impact properties and processability over the prior art PPE/polyamide compositions.

SUMMARY OF THE INVENTION

There is provided in accordance with the present invention PPE/polyalkyleneterephthalamide compositions suitable for high temperature applications having a high dimensional stability comprising from about 20 to about 70 weight %, preferably from about 30 to about 60 weight %, of a functionalized PPE; from about 20 to about 70 weight %, preferably from about 30 to about 60 weight %, of a polyalkyleneterephthalamide, wherein the polyalkyleneterephthalamide is derived from terephthalic acid and an α,ω-alkanediamine having 10 to 14 methylene groups; and up to about 20 weight %, preferably from about 1 to about 10 weight %, of a functionalized elastomeric polymer, wherein the blend absorbs less than 5 wt % of moisture as measured in accordance with the ASTM D 570-81 testing procedure and has a dimensional growth in water of less than 0.5% when saturated.

The PPE/polyalkyleneterephthalamide blend compositions of the present invention provides excellent properties, including high heat and moisture dimensional stability, and excellent processability, making the blend compositions suitable for high temperature applications where dimensional stability is important.

DETAILED DESCRIPTION OF THE INVENTION

There is provided in accordance with the present invention PPE/polyalkyleneterephthalamide compositions of high dimensional stability that are suitable for high temperature applications comprising a functionalized PPE, a homo- or co-polyalkyleneterephthalamide derived mainly from terephthalic acid and an α,ω-alkanediamine having 10 to 14 methylene groups and a functionalized elastomeric polymer. The PPE/polyalkyleneterephthalamide blend compositions of the present invention exhibit useful physical properties including high moisture and heat dimensional stability, and improved chemical resistance . The PPE/polyalkyleneterephthalamide blend compositions comprise from about 20 to about 70 weight %, preferably from about 30 to about 60 weight %, of a functionalized PPE, from about 20 to about 70 weight %, preferably from about 30 to about 60 weight %, of a polyalkyleneterephthalamide and up to about 20 weight %, preferably from about 1 to about 10 weight %, of a functionalized elastomeric polymer, wherein the blend absorbs less than 5 wt %, preferably less than 3 wt %, more preferably less than 2 wt %, of moisture as measured in accordance with the ASTM D 570-81 testing procedure and has a dimensional growth in water of less than 0.5%, preferably less than 0.3%, when saturated.

PPE polymers suitable for use in the present invention are known in the art. Such PPE polymers and their manufacturing processes are disclosed, for example, in U.S. Pat. Nos. 3,306,875; 3,337,501; 3,787,361; and 4,315,086.

Preferred PPE polymers include poly(2,6-dimethyl-1,4-phenylene ether), poly(2-methyl-1,4-phenylene ether), poly(3-methyl-1,4-phenylene ether), poly(2,6-diethyl-1,4-phenylene ether), poly(2,6-dipropyl-1,4-phenylene ether), poly(2-methyl-6-alkyl-1,4-phenylene ether), poly(2,6-dichloromethyl-1,4-phenylene ether), poly(2,3,6-trimethyl-1,4-phenylene ether), poly(2,3,5,6-tetramethyl-1,4-phenylene ether), poly(2,6-dichloro-1,4-phenylene ether), poly(2,6-diphenyl-1,4-phenylene ether), poly( 2,5-dimethyl-1,4-phenylene ether) and mixtures thereof. Most preferred is poly (2,6-dimethyl-1,4-phenylene ether).

Preferred PPE polymers have a number average molecular weight of from about 10,000 to about 75,000 and an intrinsic viscosity (IV), as measured in a chloroform solution, of from about 0.3 to about 0.85 and preferably from about 0.4 to about 0.6.

Suitable PPE polymers for the present invention are functionalized with a functionalizing compound having a carbon-carbon double bond or triple bond and a functional group selected from the group consisting of carboxylic acids, anhydrides, glycidyl functionalities, and mixtures thereof. The reactive groups may be randomly distributed along the length of or at the ends of the PPE chain. The carboxyl or carboxylate functionality can be supplied by reacting PPE with a modifier of α,β-ethylenically unsaturated monocarboxylic acids, such as acrylic and methacrylic acids, as well as dicarboxylic acids having from 4 to 8 carbon atoms. Illustrative of such acid and anhydrides are maleic acid, maleic anhydride, fumaric acid, iraconic acid, iraconic anhydride, and mixtures thereof.

Preferably, the functionalized PPE of the present invention contains from about 0.1 to about 10 wt %, more preferably from about 0.1 to about 3 wt %, of the functionalizing compound based on the total weight of PPE.

The functionalized PPE is preferably prepared by melt extruding PPE with the functionalizing compound in the presence of a free radical initiator. Useful free radical initiators include peroxides such as dialkyl, diaryl, and diaryl peroxides, such as dicumyl peroxide and the like. Other useful free radical initiators include N-bromoimides such as N-bromosuccinimide, dialkylazos and the like.

Polyamides suitable for use in the present invention are hompolymers and copolymers of terephthalamides that exhibit a high melting point and a low moisture sensitivity. The suitable polyalkyleneterephthalamides of the present invention are polyamides derived mainly from terephthalic acid and alkanediamines.

Homopolymers of terephthalamide suitable for use herein are those derived from terephthalic acid and an α,ω-alkanediamine having from about 10 to about 14 methylene groups. Illustrative of the suitable α,ω-alkanediamines are 1,10-decanediamine, 1,11-undecanediamine and 1,12-dodecanediamine. Of the suitable α,ω-alkanediamines, the preferred are 1,10-decanediamine and 1,12-dodecanediamine. The polyalkyleneterephthalamides derived from 1,10-decanediamine and 1,12-dodecanediamine are known in the art as nylon 10T and nylon 12T, respectively.

Suitable copolymers of terephthalamide are the reaction products of one or more of suitable comonomers in addition to α,ω-alkanediamines and terephthalic acid. The preferred polyamide copolymers comprise from about 35 to about 50, more preferably from about 40 to about 50, mole percent of units derived from α,ω-alkanediamines, from about 35 to about 50, more preferably from about 40 to about 50, mole percent of units derived from terephthalic acid, and up to about 30, more preferably up to about 20, mole percent of units derived from at least one additional comonomer. Such suitable terephthalamide copolymers suitable for the present invention include the terephthalamide copolymers disclosed in U.S. Pat. No. 5,079,339 to Akkapeddi et al., the discussion of which is hereby incorporated by reference. The comonomers suitable for use in conjunction with the present invention include comonomer units having the following formulae:

$$-\underset{\|}{\overset{O}{C}}-(CH_2-\underset{R^2}{\overset{R^1}{C}})_p-\underset{\|}{\overset{O}{C}}-$$

$$-\underset{\|}{\overset{O}{C}}-(CH_2-CH=\underset{R^2}{C}-CH_2)_q-\underset{\|}{\overset{O}{C}}-$$

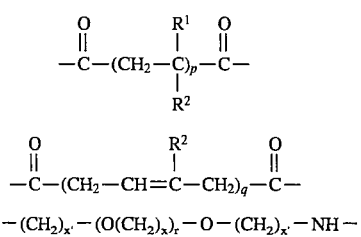

-continued

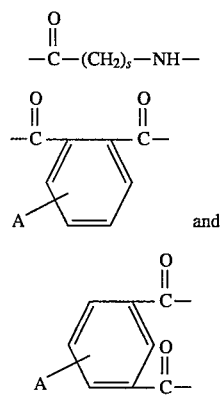

wherein
R$^1$ is selected from —H, —CH$_3$, —C$_2$H$_2$, —Cl, —CH=CH$_2$, and mixtures thereof,
R$^2$ is selected from —H, —CH$_3$, —C$_2$H$_5$, —CH=CH$_2$, and mixtures thereof,
A is selected from —H, a halogen, and a hydrocarbon having from about 1 to about 4 carbon atoms,
p is from about 2 to about 80,
q is from about 10 to about 80,
r is from about 1 to about 30, preferably about 5 to about 30,
s is from about 4 to about 9,
x is from about 4 to about 6, and
x' is from about 2 to about 6.

Polyalkyleneterephthalamides suitable for the present invention, in general, are produced by a condensation reaction of equimolar amounts of one or more of dicarboxylic acids and one or more of diamines, resulting in a carboxyl group attached to one end and an amino group attached to the other end of the polyamide chain. However, suitable polyalkyleneterephthalamides may contain unbalanced terminal carboxyl and amino end groups. Excess dicarboxylic acid or diamine monomers may be employed during the polymerization process to produce polyalkyleneterephthalamides having unbalanced carboxyl or amino end groups, respectively. Of these polyamides, most preferred are the polyalkyleneterephthalamides having more chain ends terminated by amino groups than by acid groups.

The blend compositions of the present invention further comprise a functionalized elastomeric polymer having a relatively high thermal stability such that the elastomeric polymer does not degrade from the heat exposure during the blending process. The elastomeric polymers suitable for use in the present invention can be block or graft copolymers, i.e., the elastomeric polymers are made from reactive monomers which form part of the polymer chains or branches, or graft onto the polymer. Such suitable elastomeric polymers include ethylene-α-olefin copolymers, styrenic block copolymers, core/shell rubbers, nitrile rubbers, and mixtures thereof.

Ethylene/α-olefin copolymers suitable for use herein are the copolymers of ethylene and at least one α-olefin selected from α-olefins having 3 to 8 carbon atoms, such as propylene, 1-butene, 1-pentene, 1-hexene, 1-heptene and 1-octene. The copolymers may also contain other monomers such as dienes that are conjugated or nonconjugated. Preferred dienes include butadiene, 1,4-hexadiene, dicyclopentadiene, methylene norborene and the like. Of these copolymers, preferred ethylene/α-olefin copolymers are ethylene propylene and ethylene propylene diene copolymers.

Elastomeric polymers suitable for the present invention also include styrenic block copolymers. The styrenic block copolymers include diblock copolymers, such as styrene-ethylene/butylene and styrene-ethylene/propylene block copolymers, and triblock copolymers, such as styrene-ethylene/butylene-styrene and styrene-ethylene/propylenestyrene. These styrenic block copolymers suitable for the present invention are commercially available from Shell Chemical Co. under the tradename Kraton.

Another group of elastomeric polymers suitable for the present invention is the core/shell rubbers comprising a core of crosslinked polybutadiene or butyl acrylate copolymer, and a shell of polymethylene methacrylate and optionally styrene and/or acrylonitrile. The core/shell rubbers suitable for the present invention are disclosed, for example, in U.S. Pat. No. 4,495,324, the discussion of which is hereby incorporated by reference.

Yet another group of elastomeric polymers suitable for the present invention is nitrile rubbers. The nitrile rubbers useful with the present invention are copolymers of butadiene and acrylonitrile. Such nitrile rubbers are disclosed, for example, in U.S. Pat. No. 4,803,247, the discussion of which is hereby incorporated by reference.

The elastomeric polymers of the present invention are functionalized with a functionalizing compound having a carbon-carbon double bond or triple bond and a functional group selected from the group consisting of carboxylic acids, anhydrides, amines, glycidyl functionalities, and mixtures thereof. The reactive groups may be randomly distributed along the length of or at the ends of the elastomeric polymer chain. The carboxyl or carboxylate functionality can be supplied by reacting the elastomeric polymers with a modifier taken from the class consisting of $\alpha,\beta$-ethylenically unsaturated monocarboxylic acids such as acrylic and methacrylic acids as well as dicarboxylic acids having from 4 to 8 carbon atoms. Illustrative of such acid and anhydrides are maleic acid, maleic anhydride, fumaric acid, iraconic acid, iraconic anhydride, and mixtures thereof. The elastomeric polymers of the present invention may also be functionalized with glycidyl methacrylate.

The functionalized elastomeric polymer of the present invention may be prepared in the same manner as with the functionalizing process of the PPE polymers as disclosed above, e.g., by melt extrusion. Preferably, the amount of the functionalizing compound incorporated into the elastomeric polymer, based on the weight of the elastomeric polymer, is from about 0.1 to about 10%, more preferably from about 0.2 to about 3%.

The compositions of the present invention may further include one or more conventional additives such as stabilizers and inhibitors of oxidative, thermal, and ultraviolet light degradation; lubricants and mold release agents; colorants including dyes and pigments; fibrous and other fillers and reinforcements; nucleating agents; plasticizers; flame retardants; and the like.

The following is an illustration of many useful additives. The oxidative and thermal stabilizers useful in the present invention include, for example, Group I metal halides, e.g., sodium, potassium, lithium with cuprous halides, e.g., chloride, bromide, iodide; hindered phenols; hydroquinones, and varieties of substituted members of those groups and combinations thereof.

The ultraviolet light stabilizers useful in the present invention include various substituted resorcinols, salicylates, benzotriazoles, benzophenones, and the like.

Suitable lubricants and mold releasing agents include stearic acid, stearyl alcohol, and stearamides. Suitable organic dyes include nigrosine, while suitable pigments include titaniumdioxide, cadmium sulfide, cadmium selenide, phthalocyanines, ultramarine blue, carbon black, and the like. Suitable fillers include carbon fibers, glass fibers, amorphous silica, asbestos, calcium silicate, aluminum silicate, magnesium carbonate, kaolin, chalk, powdered quartz, mica, feldspar, and the like including organo-clay disclosed in 1991 Japanese Patent Publication (Kokai) No. 215557.

Suitable flame retardants include organic halogenated compounds such as polybrominated diphenylethers, e.g., decabromodiphenyl ether, octabromodiphenyl ether, brominated phthalate esters and the like.

Blending or mixing of the constituents which comprise the blend compositions may be accomplished by any effective means which will preferably provide a uniform dispersion. All of the constituents may be mixed simultaneously or separately by a mixer, blender, kneader, roll, extruder, or the like in order to assure a uniform blend of the constituents, and the resultant mixture is melt-kneaded or melt-extruded with the remaining constituents in an extruder or the like to make a uniform blend. The most common method is melt-kneading a previously dry-blended composition further in a heated extruder provided with a single or a plurality of screws to extrude the uniform composition into strands, and subsequently chopping the extruded strands into pellets. A preferred method is to utilize an extruder equipped with multiports such that the PPE and the elastomeric polymer are preblended before the polyamide is added to a subsequent port.

Preferably, the melt-kneading or melt-extruding process is performed at a temperature setting that provides a melt temperature between about 280° C. and about 330° C. The processing melt temperature of the blend compositions of the present invention should not exceed about 340° C. in order to prevent thermal degradation of the components of the blend compositions.

The blend compositions of the present invention may be used for the production of conventional articles formable from thermoplastic materials in a conventional manner. By way of example and not of limitation, such articles include sheets, tubings, wire and cable jacketing, profiled shapes, coatings, parisons for blow molding, as well as others not particularly denoted here. Typically, the composition will be used to form products by extruding or injection molding a quantity of the composition, which has been previously produced, such as by an extrusion process into pellets, by first heating the preformed pellets to a fluid melt under the action of applied heat, compression and shear effects, and subsequently forcing a quantity of the melted composition into a mold or form where it is allowed to solidify.

Examples are set forth below to illustrate the nature of the invention and the manner of carrying it out. However, the invention should not be considered as being limited to the details thereof.

Flexible modulus, tensile strength, elongation, notched izod and heat deflection temperature (DTUL) were measured in accordance with the ASTM D-790-90, D-638-90, D-638-90, D 256-90 and D-648-82 testing procedures, respectively. Dimensional growth, heat sag and coefficient of thermal expansion (CTE) were measured in accordance with the ASTMD- 570-81, D-3769-85 and D-696-79 testing procedures, respectively. The water absorption was the % increase in the weight of a test specimen that was placed under water at room temperature until the specimen was saturated with water.

EXAMPLES

Preparation of Nylon 12T

A two gallon autoclave was charged with 1500 g (7.49 moles) of 1,12-dodecanediamine, 1219 g (7.34 moles) terephthalic acid, 1200 ml of water and 6.8 g of sodium hypophsphite as a catalyst. The vessel was purged with nitrogen and the pressure control valve was set at 2.1 MPa (300 psi) before the vessel was slowly heated. In 2 hours, the steam pressure reached 2.1 MPa and water began to distill. The distillation was completed after an additional 2⅓ hours, and the final vessel temperature of 320° C. was reached 1 hour thereafter. The vessel pressure was, then, reduced to 0.6 MPa (90 psi), and the resulting polymer content was extruded and dried at 110° C. under 1 mmHg vacuum.

Functionalization of PPE

Poly(2,6-dimethylphenylene ether) having an intrinsic viscosity of 0.45 (available from Sumitomo Chemical) was functionalized by dry blending 1 wt % of fumaric acid and then melt processing the mixture in a Haake TW-100 conical twin screw extruder. The extruder was operated at a screw speed of 60 rpm and had a temperature profile of 250° C. for zone 1, 260° C. for zone 2, and 270° C. for zones 3 and 4. The resulting functionalized PPE extrudate was air cooled and pelletized.

Example 1

In order to ensure homogeneous blending of the PPE/nylon 12T composition, a two-step extrusion process was utilized. The functionalized PPE from the above was melt extruded on the above-mentioned Haake extruder with 16.7 wt % of a maleated styrene-ethylene-butadiene-styrene (SEBS) rubber having 2% maleic anhydride content (available from Shell Chemical Co. under the tradename Kraton FG-1901X). The temperature profile of the extruder was 200° C. for zone 1, 240° C. for zone 2, and 270° C. for zones 3 and 4, and the screw was operated at 50 rpm. The resulting extrudate was water cooled, pelletized, and dried overnight under 1 mmHg vacuum at 100° C.

The dried PPE/SEBS pellets were again melt extruded with 40 wt % of the above-described nylon 12T in the Haake extruder. The temperature profile of the extruder was 260° C. for zone 1, 290° C. for zone 2, and 300° C. for zones 3 and 4, and the screw was operated at 60 rpm. The resulting extrudate was water cooled, pelletized, and dried overnight under 1 mmHg vacuum at 110° C.

Example 2

A PPE/nylon 12T blend was prepared using a maleated ethylene-propylene rubber (available from Exxon under the tradename Exelor® VA-1803) in accordance with the procedure outlined in Example 1.

Control 1 (C1)

A PPE/nylon 6 blend was prepared using the maleated ethylene-propylene rubber disclosed above in accordance with the procedure outlined in Example 2. The nylon 6 utilized was amine-terminated nylon having a formic acid viscosity of 58, which is available from Allied-Signal Inc. under the trademark Capron®.

Control 2 (C2)

A PPE/nylon 12T blend without elastomeric polymer in accordance with the second melt extrusion procedure outlined in Example 1. The Control 2 blend composition was comprised of 50 wt % fumaric acid modified PPE and 50 wt % nylon 12T.

Control 3–4 (C3-C4)

Nylon 12T, polymerized as described above, and nylon 6, having the properties described in Control 1, are analyzed as Controls 3 and 4, respectively.

The results are shown in Table 1.

TABLE 1

|  | Ex. 1 | Ex. 2 | C1 | C2 | C3 | C4 |
|---|---|---|---|---|---|---|
| PPE (wt %) | 50 | 50 | 50 | 50 | — | — |
| Nylon 12T (wt %) | 40 | 40 | — | 50 | 100 | — |
| Nylon 6 (wt %) | — | — | 40 | — | — | 100 |
| Elastomer (wt %) | 10 | 10 | 10 | — | — | — |
| Flex. Modulus (MPa) | 1970 | 1710 | 1900 | 2390 | 2450 | 2830 |
| Tens. Strength (MPa) | 55 | 62 | 55 | 48 | 83 | 83 |
| Elongation @ break (%) | 51 | 9 | 50 | 1 | 15 | 70 |
| N. Izod (Joules/m) | 427 | 534 | 534 | 21 | 53 | 53 |
| DTUL @ 455 KPa (°C.) | 188 | 196 | 185 | — | 240 | 185 |
| Heat Sag @ 190° C. (in) | — | 0.32 | 0.4 | — | — | — |
| Water absorption (%) | 1.1 | 1.4 | 3.8 | — | 1.8 | 9 |
| Dimensional growth in water (%) | 0.29 | — | 0.9 | — | 0.075 | 2.5 |
| CTE (ppm/°C.) | 81 | — | 99 | — | 97 | 107 |

As can be seen from Table 1, the DTUL, heat sag, water absorption and dimensional growth data of Examples 1–2 and Controls 1,2 and 4, the PPE/nylon 12T blend compositions of the present invention provide improved thermal properties and moisture dimensional stability over the prior art PPE/nylon 6 blend compositions and nylon 6. The CTE data for Example 1 and Controls 1, 3 and 4 demonstrates the improved thermal dimensional stability of the present blend compositions over the prior art blends, nylon 12T, and nylon 6.

The PPE/polyalkyleneterephthalamide blend compositions of the present invention, which exhibit excellent thermal properties and high heat and moisture dimensional stability, are useful for the production of articles conventionally formed from thermoplastic polymers. Particularly, the present blend compositions are excellent materials to form large parts that are exposed to heat and moisture, such as automobile body panels and the like.

What is claimed is:

1. A polyphenylene ether/polyalkyleneterephthalamide composition having a high heat and moisture dimensional stability comprising from about 20 to about 70 weight % of a functionalized polyphenylene ether, from about 20 to about 70 weight % of a polyalkyleneterephthalamide, said polyalkyleneterephthalamide derived from terephthalic acid and an α,ω-alkanediamine having about 10 to about 14 methylene groups and has a crystalline melting point in the range of 250°–300° C., and up to about 20 weight % of a functionalized elastomeric polymer, said polyphenylene ether being functionalized with a functionalizing compound having a carbon-carbon double bond or triple bond and a functional group selected from the group consisting of carboxylic acids, anhydrides, glycidyl functionalities, and mixtures thereof, wherein the composition absorbs less than 2 wt % of moisture as measured in accordance with the ASTM D 570-81 testing procedure and has a dimensional growth in water of less than 0.5% when saturated.

2. The polyphenylene ether/polyalkyleneterephthalamide composition according to claim 1, wherein said polyphenylene ether is selected from the group consisting of poly(2,6-dimethyl-1,4-phenylene ether), poly(2-methyl-1,4-phenylene ether ), poly(3-methyl-1,4-phenylene ether), poly(2,6-diethyl-1,4-phenylene ether), poly(2,6-dipropyl-1,4-phenylene ether), poly(2-methyl-6-alkyl-1,4-phenylene ether), poly(2,6-dichloromethyl- 1,4-phenylene ether), poly(2,3,6-trimethyl-1,4-phenylene ether), poly(2,3, 5,6-tetramethyl-1,4-phenylene ether), poly(2,6-dichloro-1,4-phenylene ether), poly(2,6-diphenyl-1,4-phenylene ether), poly(2,5-dimethyl-1,4-phenylene ether) and mixtures thereof.

3. The polyphenylene ether/polyalkyleneterephthalamide composition according to claim 1, wherein said polyphenylene ether is poly(2,6-dimethyl-1,4-phenylene ether).

4. The polyphenylene ether/polyalkyleneterephthalamide composition according to claim 1 comprising from about 30 to about 60 weight % of said functionalized polyphenylene ether, from about 30 to about 60 weight % of said polyalkyleneterephthalamide, and from about 1 to about 10 weight % of said functionalized elastomeric polymer.

5. The polyphenylene ether/polyalkyleneterephthalamide composition according to claim 1, wherein said functionalizing compound constitutes from about 0.1 wt % to about 10 wt % of the total weight of said functionalized polyphenylene ether.

6. The polyphenylene, ether/polyalkyleneterephthalamide composition according to claim 5, said polyphenylene ether is functionalized with a compound selected from the group consisting of maleic acid, maleic anhydride, fumaric acid, itaconic acid, itaconic anhydride, and mixtures thereof.

7. The polyphenylene ether/polyalkyleneterephthalamide composition according to claim 5 wherein said polyphenylene ether is functionalized with fumaric acid.

8. The polyphenylene ether/polyalkyleneterephthalamide composition according to claim 1, wherein said polyalkyleneterephthalamide is derived from terephthalic acid and 1,10-decanediamine.

9. The polyphenylene ether/polyalkyleneterephthalamide composition according to claim 1, wherein said polyalkyleneterephthalamide is derived from terephthalic acid and 1,12-dodecanediamine.

10. The polyphenylene ether/polyalkylene-terephthalamide composition according to claim 1 wherein said polyalkyleneterephthalamide comprises from about 35 to about 50 mole percent of units derived from said α,ω-alkanediamine, from about 35 to about 50 mole percent of units derived from terephthalic acid, and up to about 30 mole percent of units derived from at least one additional comonomer.

11. The polyphenylene ether/polyalkylene-terephthalamide composition according to claim 10, wherein said additional comonomer is selected from the group consisting of monomer units having the following formulae:

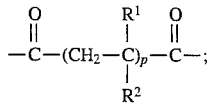

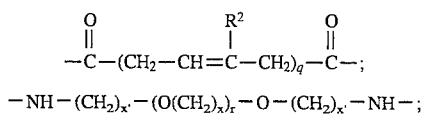

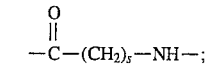

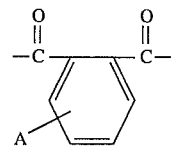

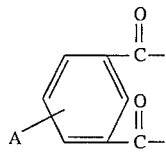

wherein $R^1$ is selected from —H, 13 $CH_3$, —$C_2H_5$, —Cl, —CH=$CH_2$, and mixtures thereof, $R^2$ is selected from —H, —$CH_3$, —$C_2H_5$, —CH=$CH_2$, and mixtures thereof, A is selected from —H, a halogen, and a hydrocarbon having from about 1 to about 4 carbon atoms, p is from about 2 to about 80, q is from about 10 to about 80, r is from about 1 to about 30, s is from about 4 to about 9, x is from about 4 to about 6, and x' is from about 2 to about 6.

12. The polyphenylene ether/polyalkylene-terephthalamide composition according to claim 1, wherein said elastomeric polymer is selected from the group consisting of ethylene-a-olefin copolymers, styrenic block copolymers, core/shell rubbers, nitrile rubbers, and mixtures thereof.

13. The polyphenylene ether/polyalkyleneterephthalamide composition according to claim 1, herein said elastomeric polymer is selected from the group consisting of styrene-ethylene/butadiene-styrene rubber, ethylene-propylene rubber and styrene-ethylene/butylene rubber.

14. The polyphenylene ether/polyalkylene-terephthalamide composition according to claim 1, wherein said elastomeric polymer is functionalized with a compound having a carbon-carbon double bond or triple bond and a functional group selected from the group consisting of carboxylic acids, anhydrides, amines and glycidyl functionalities, and mixtures thereof wherein said functionalizing compound constitutes from about 0.1 wt % to about 10 wt % of the total weight of said functionalized elastomeric polymer.

15. The polyphenylene ether/polyalkylene-terephthalamide composition according to claim 14, wherein said elastomeric polymer is functionalized with a compound selected from the group consisting of maleic acid, maleic anhydride, fumaric acid, itaconic acid, itaconic anhydride, and mixtures thereof.

16. The polyphenylene ether/polyalkylene-terephthalamide composition according to claim 14, wherein said elastomeric polymer is functionalized with fumaric acid.

17. The polyphenylene ether/polyalkylene-terephthalamide composition according to claim 14 wherein said elastomeric polymer is functionalized with maleic anhydride.

18. The polyphenylene ether/polyalkyleneterephthalamide composition according to claim 1 wherein said polyalkyleneterephthalamide exhibits a crystalline melting point in the range of 270° C.–290° C.

19. A composition having a high heat and moisture dimensional stability comprising:
   a) from about 20 to about 70 weight percent of a polyphenylene ether functionalized with fumaric acid;
   b) from about 20 to about 70 weight percent of a polyalkyleneterephthalamide, said polyalkyleneterephthalamide derived from terephthalic acid and 1,12-dodecanediamine and has a crystalline melting point in the range of 250° C.–300° C.; and
   c) up to about 20 weight percent of a maleated styrene-ethylene-butadienestyrene rubber wherein said composition absorbs less than 2 weight percent of moisture as measured in accordance with ASTM D 570 -81 testing procedure, and has a dimensional growth in water of less than 0.5% when saturated.

20. A composition having a high heat and moisture dimensional stability comprising:
   a) from about 20 to about 70 weight percent of a polyphenylene ether functionalized with fumaric acid;
   b) from about 20 to about 70 weight percent of a polyalkyleneterephthalamide, said polyalkylene terephthalamide derived from terephthalic acid and 1,12-dodecanediamine and has a crystalline melting point in the range of 250° C.–300° C.; and
   c) up to about 20 weight percent of a maleated ethylene-propylene rubber wherein said composition absorbs less than 2 weight percent of moisture as measured in accordance with ASTM D 570 -81 testing procedure and has a dimensional growth in water of less than 0.5% when saturated.

* * * * *